(12) United States Patent
Chen et al.

(10) Patent No.: US 9,420,256 B2
(45) Date of Patent: Aug. 16, 2016

(54) IMAGE SIGNAL ACQUISITION METHOD AND IMAGE SIGNAL ACQUISITION DEVICE

(71) Applicant: SHENZHEN CHINA STAR OPTOELECTRONICS TECHNOLOGY CO., LTD, Shenzhen (CN)

(72) Inventors: Lixuan Chen, Shenzhen (CN); Bin Fang, Shenzhen (CN); Hongjiang Qin, Shenzhen (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 262 days.

(21) Appl. No.: 14/131,910

(22) PCT Filed: Dec. 20, 2013

(86) PCT No.: PCT/CN2013/090126
§ 371 (c)(1),
(2) Date: Jan. 10, 2014

(87) PCT Pub. No.: WO2015/089832
PCT Pub. Date: Jun. 25, 2015

(65) Prior Publication Data
US 2015/0172624 A1    Jun. 18, 2015

(30) Foreign Application Priority Data
Dec. 17, 2013 (CN) .......................... 2013 1 0693793

(51) Int. Cl.
*H04N 13/04* (2006.01)
*H04N 13/00* (2006.01)
(Continued)

(52) U.S. Cl.
CPC ....... *H04N 13/0025* (2013.01); *H04N 13/0438* (2013.01)

(58) Field of Classification Search
CPC .......... H04N 13/0025; H04N 13/0438; H04N 13/0296; H04N 13/0044
USPC .......................................................... 348/48
See application file for complete search history.

(56) References Cited

U.S. PATENT DOCUMENTS 4,574,393 A * 3/1986 Blackwell ............. B07C 5/3422
348/34
5,057,182 A * 10/1991 Wuchinich ................ B06B 3/00
156/580.1

(Continued)

OTHER PUBLICATIONS

Wayback Machine: Matlab interp2 function http://nf.nci.org.au/facilities/software/Matlab/techdoc/ref/interp2.html Nov. 9, 2013.*

*Primary Examiner* — Hee-Yong Kim
(74) *Attorney, Agent, or Firm* — Mark M. Friedman

(57) ABSTRACT

A method of acquiring image signal and an image signal acquisition device are proposed. The method includes steps: measuring brightness signals of gray-scale switched images in a sample gray scale, and nonlinear interpolating the brightness signals of the gray-scale switched images in the sample gray scale to acquire brightness signals of full gray-scale switched images. The nonlinear interpolating is cubic spline interpolating. the image signal acquisition method and the image signal acquisition device in the present invention nonlinear interpolates brightness signals of gray-scale switched images in sample gray scale to acquire brightness signals of full gray-scale switched images, and thus it efficiently acquires brightness signals of switched images in different gray scales.

4 Claims, 2 Drawing Sheets

(51) Int. Cl.
*H04N 13/02* (2006.01)
*H04N 1/00* (2006.01)

(56) References Cited

U.S. PATENT DOCUMENTS

| | | | | | |
|---|---|---|---|---|---|
| 5,369,499 | A * | 11/1994 | Yip | | H04N 1/4078 |
| | | | | | 358/406 |
| 5,696,602 | A * | 12/1997 | Cooper | | H04N 1/4051 |
| | | | | | 358/3.18 |
| 5,732,107 | A * | 3/1998 | Phillips | | H03H 17/028 |
| | | | | | 375/229 |
| 6,213,653 | B1 * | 4/2001 | Borg | | G06T 3/4007 |
| | | | | | 345/606 |
| 6,256,090 | B1 * | 7/2001 | Chen | | G01V 1/3835 |
| | | | | | 250/227.14 |
| 8,400,492 | B2 * | 3/2013 | Cowan | | G02B 27/0018 |
| | | | | | 348/42 |
| 2003/0132999 | A1 * | 7/2003 | Yamano | | B41J 2/2107 |
| | | | | | 347/106 |
| 2006/0204040 | A1 * | 9/2006 | Freeman | | G06T 7/2033 |
| | | | | | 382/107 |
| 2007/0078846 | A1 * | 4/2007 | Gulli | | G06F 17/30247 |
| 2009/0262981 | A1 * | 10/2009 | Ike | | G06K 9/3233 |
| | | | | | 382/103 |
| 2012/0105871 | A1 * | 5/2012 | Kim | | G02B 27/2228 |
| | | | | | 356/614 |
| 2012/0147138 | A1 * | 6/2012 | Yu | | G02B 27/26 |
| | | | | | 348/43 |
| 2013/0127832 | A1 * | 5/2013 | Lee | | H04N 13/0404 |
| | | | | | 345/419 |
| 2015/0172624 | A1 * | 6/2015 | Chen | | H04N 13/0438 |
| | | | | | 348/43 |

* cited by examiner

IMAGE SIGNAL ACQUISITION METHOD AND IMAGE SIGNAL ACQUISITION DEVICE

BACKGROUND OF THE INVENTION

1. Field of the Invention

The present invention relates to a signal process field, more particularly, to an image signal acquisition method and an image signal acquisition device.

2. Description of the Prior Art

With social development, more and more consumers use liquid crystal displays (LCD) in various social activities. 3D shutter LCD is particularly used to meet the demand for watching 3D videos. It needs images in different flames to display left-eye signals and right-eye signals with an usage of 3D shutter LCD. Switch interval between left-eye signals and right-eye signals is shorter on account of higher image refresh frequency, and thus crosstalk occurs easily.

To eliminate image crosstalk effectively, the 3D shutter LCD over drives switch signals between left-eye signals and right-eye signals to curtail a switch interval between the left-eye signals and the right-eye signals to avoid crosstalk.

In hence, a setup of brightness signal in switched images (no crosstalk with the brightness signal) in different gray scales of the 3D shutter LCD is achieved by a brightness signal from measuring a switch for 256*256 set (i.e. measuring a brightness signal for switched right-eye images in 256 gray scales while fixing gray scale of left-eye images, then switching the gray scale of the left-eye images and measuring a brightness signal for switched right-eye images in 256 gray scales until switching left-eye images in 256 gray scales) or achieved by measuring a brightness signal in a switch of 64*64 and linear interpolating the measurement.

No matter which method is, both need tremendous measurement or operation for gray scale brightness, and both are lower efficient to acquire brightness signals in different gray scales of LCDs.

Therefore, it is necessary to provide an image signal acquisition method and an image signal acquisition device to solve the problems in the prior art.

SUMMARY OF THE INVENTION

The object of the present invention is to provide an image signal acquisition method for efficiently acquire brightness signals in different gray scales of an LCD and an image signal acquisition device thereof to solve the technical problem for the image signal acquisition method and the image signal acquisition device in the prior art that less efficiently acquire brightness signals of switched images in different gray scales of an LCD.

According to the present invention, a method of acquiring image signal comprises steps:

measuring brightness signals of gray-scale switched images in a sample gray scale, and nonlinear interpolating the brightness signals of the gray-scale switched images in the sample gray scale to acquire brightness signals of full gray-scale switched images;

wherein the nonlinear interpolating is cubic spline interpolating;

wherein the step of cubic spline interpolating comprises:

constructing a sample brightness signal matrix according to the gray-scale images of the sample gray scale before switching, that of the sample gray scale after switching and the brightness signals of the gray-scale switched images of the sample gray scale; and 2D interpolating the sample brightness signal matrix by calling interp2 interpolation function to adopt cubic spline interpolation for generating brightness signals of 2D full-gray scale switched images;

wherein when performing 2D interpolating, it sets up boundary condition of the interpolation as a third derivative of boundary endpoint identical to that of neighbor points of the boundary endpoints.

In one aspect of the present invention, a sample number of the gray-scale images before switching and after switching is 17, and a size of the sample brightness signal matrix is 17*17.

In another aspect of the present invention, a sample number of the gray-scale images before switching and after switching is 33, and a size of the sample brightness signal matrix is 33*33.

In yet another aspect of the present invention, a sample number of the gray-scale images before switching and after switching is 256, and a size of the sample brightness signal matrix is 256*256.

According to the present invention, a method of acquiring image signal comprises steps:

measuring brightness signals of gray-scale switched images in a sample gray scale, and nonlinear interpolating the brightness signals of the gray-scale switched images in the sample gray scale to acquire brightness signals of full gray-scale switched images;

wherein the nonlinear interpolating is cubic spline interpolating.

In one aspect of the present invention, the step of cubic spline interpolating comprises:

constructing a sample brightness signal matrix according to the gray-scale images of the sample gray scale before switching, that of the sample gray scale after switching and the brightness signals of the gray-scale switched images of the sample gray scale; and 2D interpolating the sample brightness signal matrix by calling interp2 interpolation function to adopt cubic spline interpolation for generating brightness signals of 2D full-gray scale switched images.

In another aspect of the present invention, when performing 2D interpolation, it sets up boundary condition of the interpolation as a third derivative of boundary endpoint identical to that of neighbor points of the boundary endpoints.

In another aspect of the present invention, a sample number of the gray-scale images before switching and after switching is 17, and a size of the sample brightness signal matrix is 17*17.

In still another aspect of the present invention, a sample number of the gray-scale images before switching and after switching is 33, and a size of the sample brightness signal matrix is 33*33.

In yet another aspect of the present invention, a sample number of the gray-scale images before switching and after switching is 256, and a size of the sample brightness signal matrix is 256*256.

According to the present invention, an image signal acquisition device comprises:

a sample gray scale brightness measuring module for measuring brightness signals of gray-scale switched images in a sample gray scale; and a full gray-scale brightness acquisition module for nonlinear interpolating the brightness signals of the gray-scale switched images in the sample gray scale to acquire brightness signals of full gray-scale switched images;

wherein the full gray-scale brightness acquisition module adopts cubic spline interpolation to operate the nonlinear interpolation.

In one aspect of the present invention, the full gray-scale brightness acquisition module comprises:

a matrix construction unit for constructing a sample brightness signal matrix based on the gray-scale images of the sample gray scale before switching, that of the sample gray scale after switching and the brightness signals of the gray-scale switched images of the sample gray scale; and a full gray-scale brightness acquisition unit for generating brightness signals of 2D full gray-scale switched images by 2D interpolating the sample brightness signal matrix by calling interp2 interpolation function to adopt cubic spline interpolation.

In another aspect of the present invention, in 2D interpolation, it sets up boundary condition of the interpolation as a third derivative of boundary endpoint identical to that of neighbor points of the boundary endpoints.

In another aspect of the present invention, a sample number of the gray-scale images before switching and after switching is 17, and a size of the sample brightness signal matrix is 17*17.

In still another aspect of the present invention, a sample number of the gray-scale images before switching and after switching is 33, and a size of the sample brightness signal matrix is 33*33.

In yet another aspect of the present invention, a sample number of the gray-scale images before switching and after switching is 256, and a size of the sample brightness signal matrix is 256*256.

Compared with the image signal acquisition method and the image signal acquisition device in the prior art, the image signal acquisition method and the image signal acquisition device in the present invention nonlinear interpolates brightness signals of gray-scale switched images in sample gray scale to acquire brightness signals of full gray-scale switched images, and thus it efficiently acquires brightness signals of switched images in different scales. Therefore, it solves the technical problem for the image signal acquisition method and the image signal acquisition device in the prior art that less efficiently acquire brightness signals of switched images in different gray scales of an LCD.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The elements have similar structures are labeled as the same numerals in drawings.

The image signal acquisition method and the image signal acquisition device of the present invention are applied in correspondent 3D shutter liquid crystal display devices. The 3D shutter liquid crystal display devices comprise a shutter LCD and shutter glasses. The shutter LCD comprises a backlight source, a liquid crystal panel and a driving circuit for driving the liquid crystal panel to display. The liquid crystal panel alternatively generates left-eye images and right-eye images at higher refresh frequency (generally over 120 Hz), and in the meantime, the shutter glasses switch the left-eye glass and the right-eye glass to turn on or off at the same refresh frequency. In this way, users obtain better 3D image vision via the shutter glasses. The image signal acquisition method and the image signal acquisition device of the present invention are utilized/arranged in the driving circuit of the shutter LCD to effectively drive the liquid crystal panel to display and avoid crosstalk therefore.

Figure 1:
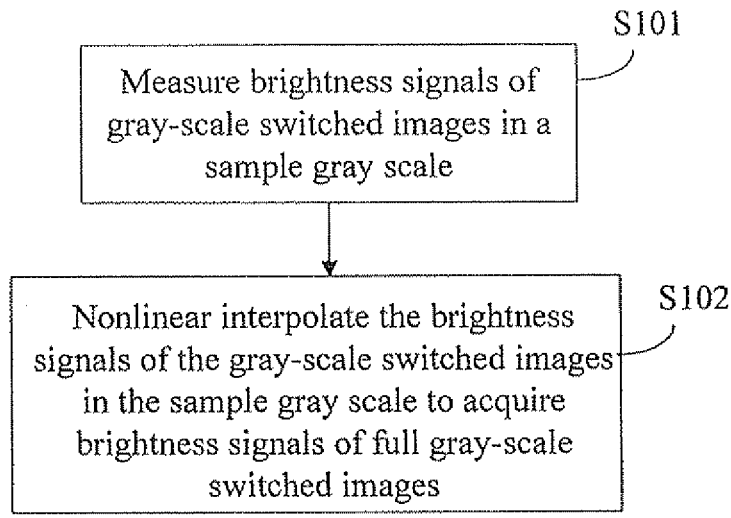
FIG. 1 is a flowchart of an image signal acquisition method of a preferred embodiment according to the present invention.

Please refer to FIG. 1, FIG. 1 is a flowchart of an image signal acquisition method of a preferred embodiment according to the present invention. The method comprises:

Step S101, measuring brightness signals of gray-scale switched images in a sample gray scale;

Step S102, nonlinear interpolating brightness signals of gray-scale switched images in the sample gray scale to acquire brightness signals of full gray-scale switched images.

The image signal acquisition method of the preferred embodiment ends in Step S102.

The following is detailed procedures for the steps of the image signal acquisition method of the preferred embodiment.

In Step S101, which is measuring brightness signals of gray-scale switched images in a sample gray scale (i.e. over driving signals), the sample gray scale comprises gray scales of images before switching (like left-eye images) and gray scales of images after switching (like right-eye images). It arranges 17 samples of the gray scales of images before switching and 17 samples of the gray scales of images after switching, and that is to say that it evenly arranges 15 grades of middle gray scale images between gray scales of pure black images and gray scales of pure white images. Therefore, the sample gray scale of images before and after switching are both 0 (pure black image), 16, 32, 48, 64, 80, 96, 112,128, 144, 160, 176, 192, 208, 224, 240, 255 (pure white image). Specifically, the gray scale of images before switching is 0, then measuring driving brightness signals of the 17 gray scales of the switched images, arranging the gray scale of the image before switching as the 16th gray scale, then measuring driving brightness signals of the 17 gray scales of the switched images until the gray scale of images before switching is the 255th gray scale. Therefore, it acquires brightness signals of gray-scale switched images in sample gray scales, whereas brightness signals of gray-scale switched images in different sample gray scales do not crosstalk when switching images. Then go to Step S102.

In Step S102, the brightness signals in Step S102 constructs and nonlinear interpolates an 17*17 sample brightness signal matrix and then acquire brightness signals of full gray-scale switched images in a 256*256 matrix. In the preferred embodiment, it adopts cubic spline interpolation to interpolate.

Figure 2:
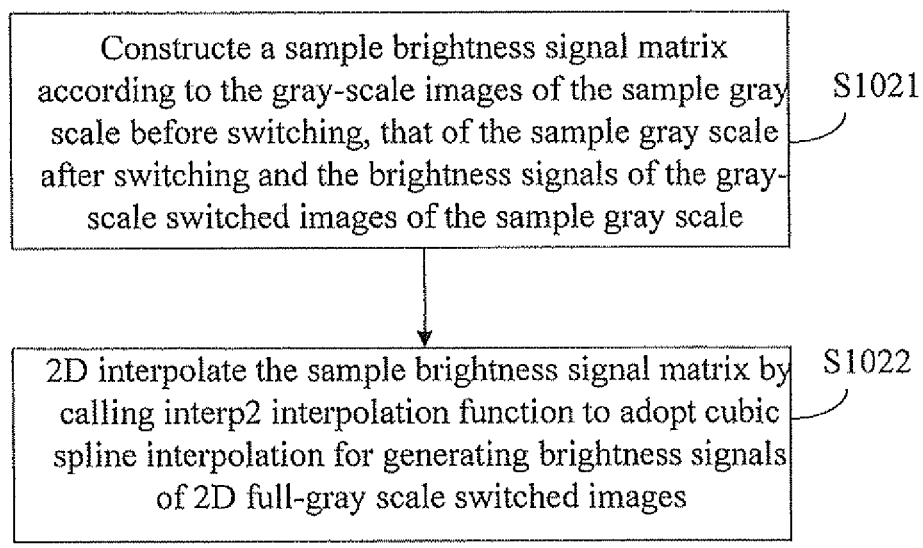
FIG. 2 is a detailed flowchart of Step S102 of the image signal acquisition method according to preferred embodiment the present invention.

Please refer to FIG. 2, FIG. 2 is a detailed flowchart of Step S102 of the image signal acquisition method according to preferred embodiment the present invention. The interpolation adopting cubic spline interpolation specifically comprises:

Step S1021, the gray-scale images of the sample gray scale before switching, that of the sample gray scale after switching and brightness signals of gray-scale switched images of the sample gray scale construct the sample brightness signal matrix;

Step S1022, 2D interpolating the sample brightness signal matrix by calling interp2 interpolation function to adopt cubic spline interpolation for generating brightness signals of 2D full gray-scale switched images.

In Step S1021, each of the brightness signals of gray-scale switched images of the sample gray scale corresponds to a gray-scale image before switching and a gray-scale image after switching. If the values of the sample gray scale before switching and after switching both are 17, it acquires 17*17 brightness signals of switched images in different gray scales. Here takes the gray-scale image before switching as column serial number, the gray scale image after switching as row serial number and the correspondent brightness signals of gray-scale switched images as data to construct a 17*17 matrix as a sample brightness signal matrix. And then comes to Step S1022.

In Step S1022, 2D interpolating the sample brightness signal matrix by calling interp2 interpolation function of MATLAB to adopt cubic spline interpolation for generating brightness signals of 2D full gray-scale switched images in a 256*256 matrix.

The intep2 interpolating function is ZI=interp2 (X, Y, Z, XI, YI, method), whereas X and Y is an array constructed by independent variable from the gray-scale images of the sample gray scale before and after switching, Size of X and Y is identical, and Z is a 2D function array constructed by the sample brightness signal matrix. XI and YI is an array constructed by independent variable from the gray-scale images in full gray-scale before and after switching, method is boundary condition by 2D interpolation, generally arranging as spline, that a third derivative of boundary endpoint and which of neighbor points of boundary endpoints is identical. Therefore, ZI that 2D function array constructed by the brightness signal of full gray-scale switched images is acquired, which means the brightness signals of 2D full gray-scale switched images in a 256*256 matrix is acquired.

This is the end of the image signal acquisition method of the preferred embodiment.

In the image signal acquisition method of the preferred embodiment, it is allowed to arrange a value of the sample gray-scale images before and after switching as 33. If so, one the hand, it boost accuracy for acquiring brightness signal of full gray-scale switched images, and on the other hand, it also increases measuring load for a part of brightness signals.

The image signal acquisition method of the preferred embodiment nonlinear interpolates brightness signals of gray-scale switched images in a sample gray scale to acquire brightness signals of full gray-scale switched images, and thus it efficiently acquires brightness signals of switched images in different gray scales.

Figure 3:
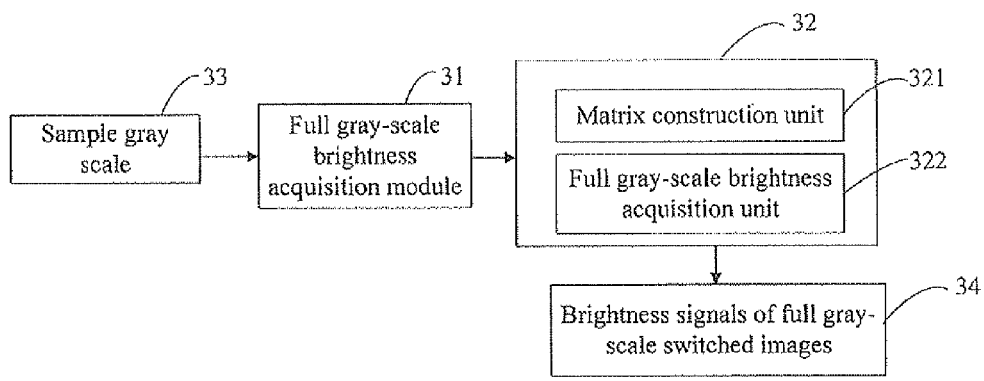
FIG. 3 is a structure diagram of the image signal acquisition device according to a preferred embodiment of the present invention.

The present invention further provides an image signal acquisition device. Please refer to FIG. 3, FIG. 3 is a structure diagram of the image signal acquisition device according to a preferred embodiment of the present invention. The image signal acquisition device 30 of the preferred embodiment comprises a sample gray scale brightness measuring module 31 and a full gray-scale brightness acquisition module 32.

The sample gray scale brightness measuring module 31 measures brightness signals of gray-scale switched images in a sample gray scale 33, and the full gray-scale brightness acquisition module 32 nonlinear interpolates the brightness signals of gray-scale switched images in a sample gray scale 33 to acquire brightness signals of full gray-scale switched image 34. The full gray-scale brightness acquisition module 32 adopts cubic spline interpolation to nonlinear interpolate.

The full gray-scale brightness acquisition module 32 comprises a matrix construction unit 321 and a full gray-scale brightness acquisition unit 322. The matrix construction unit 321 is used for constructing the sample brightness signal matrix based on the gray-scale images of the sample gray scale 33 before switching, that of the sample gray scale 33 after switching and brightness signals of gray-scale switched images of the sample gray scale 33. The full gray-scale brightness acquisition unit 322 is used for generating brightness signals 34 of 2D full gray-scale switched images by 2D interpolating the sample brightness signal matrix by calling interp2 interpolation function to adopt cubic spline interpolation.

In the usage of the image signal acquisition device 30 of the preferred embodiment, first the sample gray scale brightness measuring module 31 measures brightness signals of gray-scale switched images in the sample gray scale 33, and then the full gray-scale brightness acquisition module 32 nonlinear interpolates brightness signals of gray-scale switched images in the sample gray scale 33 to acquire the brightness signals 34 of full gray-scale switched images. Specifically, first, the matrix construction unit 321 of the full gray-scale brightness acquisition module 32 constructs the sample brightness signal matrix based on the gray scale images of the sample gray scale 33 before switching, that of the sample gray scale 33 after switching and brightness signals of gray-scale switched images of the sample gray scale 33. Secondly, The full gray-scale brightness acquisition unit 322 of the full gray-scale brightness acquisition module 32 is used for generating brightness signals 34 of 2D full gray-scale switched images 2D by interpolating the sample brightness signal matrix by calling interp2 interpolation function to adopt cubic spline interpolation.

This is the end of the signal acquisition process with the image signal acquisition device 30 of the preferred embodiment.

In the signal acquisition process with the image signal acquisition device 30 of the preferred embodiment, it is allowed to arrange a value of the sample gray-scale image before and after switching as 33. If so, one the hand, it boost accuracy for acquiring brightness signal of full gray-scale switched images, and on the other hand, it also increases measuring load for a part of brightness signals.

The specific working principle of the image signal acquisition device of the preferred embodiment is identical or similar with the relative description of the image signal acquisition method of the first preferred embodiment. The detail is instructed in the relative description of the image signal acquisition method of the first preferred embodiment.

The image signal acquisition device of the preferred embodiment nonlinear interpolates brightness signals of gray-scale switched images in sample gray scale to acquire brightness signals of full gray-scale switched images, and thus it efficiently acquires brightness signals of switched images in different gray scales.

Figure 4:
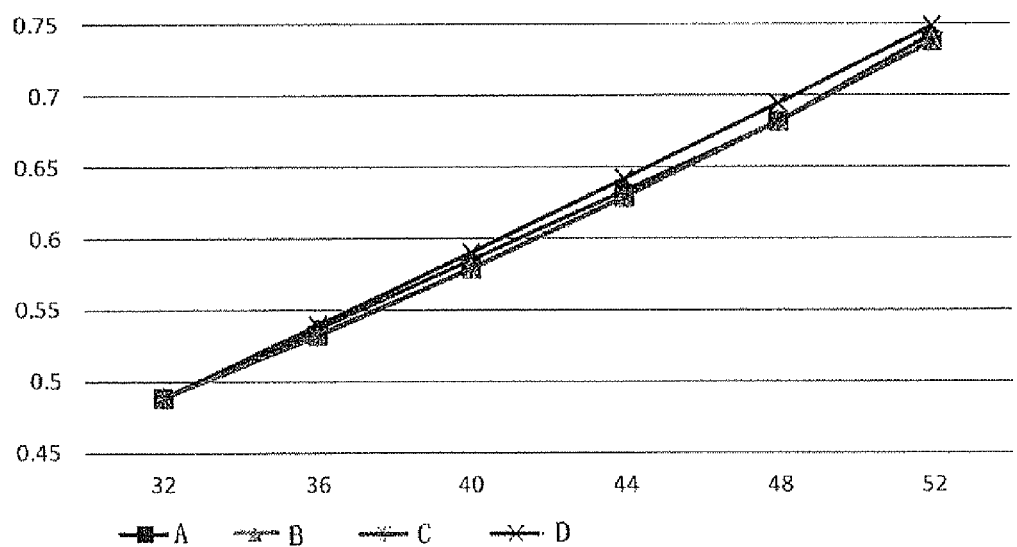
FIG. 4 is a comparative diagram that brightness signals of full gray-scale switched images acquired by brightness signals of gray-scale switched images in different samples and brightness signals of full gray-scale switched images acquired by brightness signals of 64*64 gray scales.

Please refer to FIG. 4, FIG. 4 is a comparative diagram that brightness signals of full gray-scale switched images acquired by brightness signals of gray-scale switched images in different samples and brightness signals of full gray-scale switched images acquired by brightness signals of 64*64 gray scales.

The brightness signals of full gray-scale switched images acquired by brightness signals of 64*64 gray scales is symbol A curve, Symbol B curve is that brightness signals of full gray-scale switched images acquired by nonlinear interpolating brightness signals of gray-scale switched images in 17 samples. Symbol C curve is that brightness signals of full gray-scale switched images acquired by nonlinear interpolating brightness signals of gray-scale switched images in 33 samples. Symbol D curve is that brightness signals of full gray-scale switched images acquired by nonlinear interpolating brightness signals of gray-scale switched images in 9 samples. X axis is a sample number of switched images in full gray-scale switched image (The gray scale number of images before switching is preset 0), and Y axis represents brightness signals of full gray-scale switched image.

FIG. 4 illustrates that the curve departure of the symbol D and A is larger, and the symbol B and C curves are more closely overlapped with the symbol A curve. The brightness signals of full gray-scale switched images acquired by the image signal acquisition method according to the present invention is basically identical to the brightness signals of full gray-scale switched images acquired by brightness signals of 64*64 gray scales. Due to longer time for measuring the symbol A curve and the symbol C curve, which time for the symbol A curve is 16 times than time for the symbol B curve, time for the symbol C curve is 4 times than time for the symbol B curve, the image signal acquisition method according to the present invention is capable of sufficiently boosting efficiency of acquiring brightness signals of switching images in different gray scales of an LCD.

In sum, the image signal acquisition method and the image signal acquisition device in the present invention nonlinear interpolates brightness signals of gray-scale switched images in sample gray scale to acquire brightness signals of full gray-scale switched images, and thus it efficiently acquires brightness signals of switched images in different gray scales. Therefore, it solves the technical problem for the image signal acquisition method and the image signal acquisition device in the prior art that less efficiently acquire brightness signals of switched images in different gray scales of an LCD.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A method of acquiring image signal, comprising steps:
measuring, by using a driving circuit, a brightness signals of gray-scale switched images in a sample gray scale; and
nonlinear interpolating, by using the driving circuit the brightness signals of the gray-scale switched images in the sample gray scale to acquire brightness signals of all gray-scale switched images;
wherein the nonlinear interpolating is cubic spline interpolating;
wherein the step of cubic spline interpolating comprises:
constructing, by using the driving circuit a sample brightness signal matrix according to the gray-scale images of the sample gray scale before switching, that of the sample gray scale after switching and the brightness signals of the gray-scale switched images of the sample gray scale; and
2D interpolating, by using the driving circuit the sample brightness signal matrix by calling intetp2 interpolation function to adopt cubic spline interpolation for generating brightness signals of 2D all gray-scale switched images;
wherein when performing 2D interpolating, it sets up boundary condition of the interpolation as a third derivative of boundary endpoint identical to that of neighbor points of the boundary endpoints.

2. The method of claim 1, wherein a sample number of the gray-scale images before switching and after switching is 17, and a size of the sample brightness signal matrix is 17*17.

3. The method of claim 1, wherein a sample number of the gray-scale images before switching and after switching is 33, and a size of the sample brightness signal matrix is 33*33.

4. The method of claim 1, wherein a sample number of the gray-scale images before switching and after switching is 256, and a size of the sample brightness signal matrix is 256*256.

* * * * *